(No Model.)

V. MERKEL.
COFFEE MILL AND BOX.

No. 506,369. Patented Oct. 10, 1893.

WITNESSES:
Kate Brennan
H. Obermayer

INVENTOR
Valentin Merkel
BY
Gospell Raegener
ATTORNEYS.

United States Patent Office.

VALENTIN MERKEL, OF WOOD HAVEN, NEW YORK.

COFFEE MILL AND BOX.

SPECIFICATION forming part of Letters Patent No. 506,369, dated October 10, 1893.

Application filed April 7, 1893. Serial No. 469,465. (No model.)

*To all whom it may concern:*

Be it known that I, VALENTIN MERKEL, a citizen of the United States, residing in the city of Wood Haven, in the county of Queens and State of New York, have invented certain new and useful Improvements in a Combined Coffee Mill and Box, of which the following is a specification.

The object of this invention is to furnish for domestic purposes a coffee-box and mill, which combines the advantages of a storage-box for the coffee-beans and a mill for grinding a quantity of coffee sufficient for the needs of a family. For this purpose, the invention consists of a can or box, which is provided in its bottom with a charging-opening and a closing plug and with a double top,—an interior top at the center of which a mill for grinding the coffee is arranged, and an exterior top to which is attached by means of a suitable screw-connection a detachable receptacle for the ground coffee. The rotary portion of the mill is attached to a spindle, which is supported in bearings in the bottom of the box and provided with a screw-nut for adjusting the rotary portion of the mill and with a square head for attaching the socket-shaped end of a crank-handle by which the mill is operated whenever it is desired to grind a portion of the coffee in the box. The socket-shaped end of the crank-handle fits over the square end of the spindle and over the adjusting nut, so as to prevent the changing of the position of the latter when grinding the beans, as will be fully described hereinafter and finally pointed out in the claims.

Figure 1:
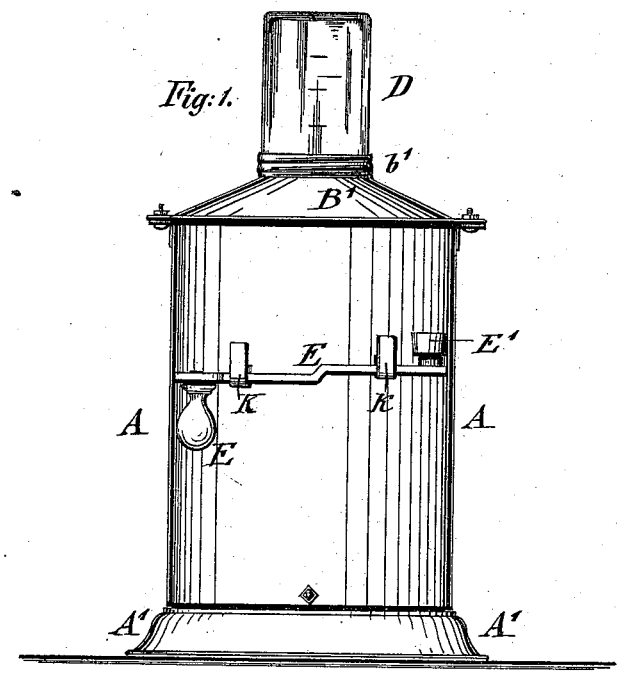
Figure 2:
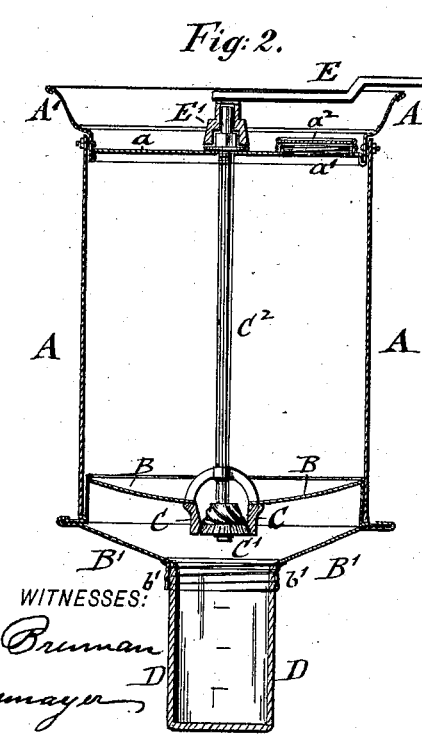
Figure 3:
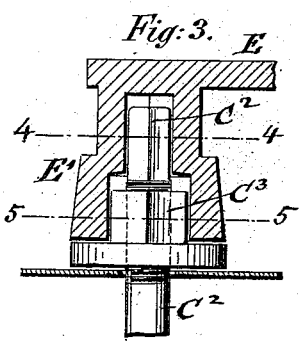
Figure 4:
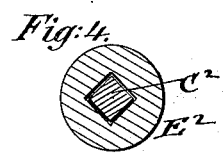
Figure 5:
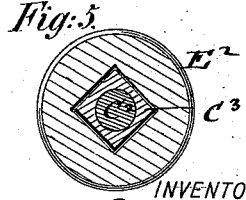

In the accompanying drawings, Figure 1, represents a side-elevation of my combined coffee-box and mill, showing the structure when in position for use as a box. Fig. 2, is a vertical central section of the same showing the same in inverted position so as to be used as a coffee-mill. Fig. 3, is a detail section, showing the connection of the crank-handle with the spindle of the mill for operating the coffee-mill, and Figs. 4 and 5 are horizontal sections on lines 4 4 and 5 5, Fig. 3.

Similar letters of reference indicate corresponding parts.

Referring to the drawings A represents a sheet-metal box, which is preferably made of cylindrical shape, and finished at the outside by japanning, varnishing, enameling or otherwise. The box A is provided in its bottom $a$ with an opening $a'$ that is closed by a screw-plug $a^2$. Below the bottom is arranged a base-portion A', which is connected by screw-bolts to the base A², the base serving as a support for the box when it is in position as a storage-box for the coffee-beans. The box A is provided with an interior top B and with an exterior top B', the interior top being provided with a central opening in which the stationary portion of a coffee-mill C is arranged. The rotary portion C' of the mill is supported inside of and centrically with the stationary portion and provided with a spindle C² which is supported in a bearing in the bottom $a$ and in a bearing near the stationary portion. The spindle C² is provided with a screw-thread at its projecting part and with a square outermost end, as shown clearly in Fig. 3.

To the threaded portion of the spindle C is applied a screw-nut C³ by which the position of the rotary grinder C' toward the fixed portion of the mill is adjusted, according as the coffee is to be ground to a more or less fine state. The exterior top B' is secured by a circumferential flange to a corresponding flange of the inner top B and provided with a screw-threaded-neck $b'$ to which is attached a cylindrical cup D, that is preferably made of glass and provided with an exterior thread which engages the threaded neck $b'$, as shown clearly in Figs. 1 and 2.

To the projecting end of the spindle C² is applied the socket-shaped inner end of a crank E, which socket-shaped end E' is enlarged so as to engage the screw-nut C³ and prevent thereby the shifting or unscrewing of the same during the grinding operation. The crank E is provided with a shoulder or offset at its middle-portion, so that its outer portion extends over the rim of the base A'. The outer end of the crank E is provided with a handle E² by which the spindle is operated when the connection of the socket-shaped inner end E' with the spindle is made.

My improved combined coffee-mill and box is operated as follows: The box A is first filled with coffee-beans through the opening $a'$ by removing the screw-plug $a^2$. The screw-plug $a^2$ is then closed again. The crank E is supported on the outside of the box in suitable keepers $k$, as shown in Fig. 1, so as to be always handy when required for use. When it is desired to grind the coffee, the box is taken down from the shelf and placed into inverted position as shown in Fig. 2, and then supported between the legs of the person grinding the coffee, the crank being then applied to the projecting end of the spindle $C^2$. On turning the crank the mill is operated, the grinding being continued until a sufficient quantity of coffee is ground into the detachable cup D. The cup is graduated at the outside, so as to indicate the quantity in the same. As soon as the required quantity is obtained, the grinding operation is discontinued, and the cup or measure D detached from the top of the box by unscrewing the same from the neck $b'$. The ground coffee is then transferred to the coffee pot and the cup D replaced in position by reconnecting it to the neck $b'$ of the top $B'$. The handle is then removed from the spindle, the box inverted again and placed on its base, the handle being then replaced in position on the supporting hooks or keepers $k$ and the entire structure replaced on the shelf.

The advantages of my improved combination coffee-mill and storage box are, first, that one and the same structure can be used for the purpose of storing a considerable quantity of coffee for family use, say a pound or more, in the box or main-portion of the same; second, that the structure can be used at any time for grinding any required quantity of coffee by simply taking it down, inverting it, applying the crank, and grinding as much coffee as is required into the detachable cup or measure D which is then at the bottom of the structure; third, that the coffee-mill is instantly ready for use, whenever required, while no separate storage box for coffee is necessary, the structure forming, owing to its convenience, of use, a comparatively cheap and useful implement for domestic purposes.

Having thus described my invention, I claim as new and desire to secure by Letters Patent—

1. A combined coffee canister and mill comprising an invertible box having a grinding mill in its top, a spindle journaled in suitable supports in said box and means for turning said spindle, the rotary portion of said mill being attached to said spindle and disposed with its apex pointing downward in the normal position of the box, substantially as described.

2. A combined coffee canister and mill comprising an invertible box having a grinding mill in its top, a spindle journaled in suitable supports in said box, means for turning said spindle, a cover for the top of said box provided with a central opening, and a detachable receptacle engaging said cover and closing said opening, the rotary portion of said mill being disposed on said spindle with its apex downward when the canister is in normal position.

3. A combined coffee canister and mill comprising an invertible box, a grinding mill disposed in the upper part thereof, a supporting base extending below the bottom of said box, a spindle, the rotary portion of the mill being attached to the inner end of said spindle, and the outer end projecting through the bottom of said box and terminating within said supporting base, and a crank handle adapted to engage the projecting end of the spindle, substantially as described.

4. The combination, of a storage-box, a coffee-mill, the fixed portion of which is arranged in the top-part of the box, a spindle supported in bearings of the box and attached to the rotary portion of the mill, a screw-nut engaging the outer threaded end of the spindle for adjusting the grinder of the mill, and a crank-handle having a socket with an enlarged portion for engaging the outer square end of the spindle and the screw-nut, substantially as set forth.

In testimony that I claim the foregoing as my invention I have signed my name in presence of two subscribing witnesses.

VALENTIN MERKEL.

Witnesses:
PAUL GOEPEL,
CHARLES SCHROEDER.